Patented May 2, 1933

1,906,729

UNITED STATES PATENT OFFICE

WILLIS F. WASHBURN AND LEIF AAGAARD, OF ST. LOUIS, MISSOURI, ASSIGNORS TO TITANIUM PIGMENT COMPANY, INC., OF NEW YORK, N. Y., A CORPORATION OF MAINE

MANUFACTURE OF TITANIUM PIGMENTS

No Drawing. Application filed September 24, 1929. Serial No. 394,917.

The source of titanium for the manufacture of pigments is, in practically all cases, ilmenite or a titanium concentrate thereof. This ore is widely distributed in nature; it is theoretically an iron titanate, $FeTiO_3$, but seldom if ever corresponds exactly to this composition, which varies, the titanium oxide usually being present from 38 to 55%, ferric oxide from 5 to 30%, and ferrous oxide from 40 to 5%. Small amounts of oxides of other elements, such as calcium, magnesium, silicon, etc. are usually present.

Many methods for its decomposition have been proposed; the one most used today is a digestion with concentrated sulphuric acid. The sulphates thus formed are dissolved in water to a more or less concentrated solution and, as a preliminary step to the separation of the titanium, all ferric iron is reduced to ferrous, either electrolytically or by the addition of metallic elements such as metallic iron or zinc.

This reduction is usually continued until a small amount of the titanium is in the titanous state, after which any insoluble residue is allowed to settle. A part of the iron is sometimes separated at this stage by lowering the temperature of the solution and allowing ferrous sulphate to crystallize out.

In the manufacture of pigments, the titanium is usually separated from the other elements, except those with which it is chemically combined in the resulting compound, through precipitation by hydrolysis. One method in causing this hydrolysis to take place is to elevate the temperature of the solution itself; another is to run the solution into a large volume of hot water.

Extenders are white or nearly white materials, which are relatively non-opaque when mixed with non-aqueous vehicles. They are commonly used in coating compositions together with the opaque pigments both as fillers and also for the purpose of imparting thereto specific properties as desired.

Composite titanium pigments are manufactured by introducing into the solution an extender such as blanc fixe, silica, calcium sulphate, etc., boiling until substantially all of the titanium is precipitated by hydrolysis, separating the resultant composite precipitate, and calcining. This general process has worked very well for composites containing relatively low percentages of titanium oxide, up to about 35 to 40 per cent, but certain difficulties in obtaining satisfactory finished products have been experienced in manufacturing composites containing higher percentages of titanium oxide and especially in manufacturing pure titanium oxide. Furthermore, it has been necessary to select carefully the extender in making composites of low percentage titanium oxide, a good grade of very finely divided blanc fixe, for example, having been essential in order to obtain a good barium sulphate-titanium oxide composite.

Milled natural barytes has not, in so far as we are aware, been satisfactorily used, prior to our invention. In manufacturing pure titanium oxide, ordinary methods of precipitation by hydrolysis often result in a product, which after washing and calcining, possesses poor color and opacity. Good products have been obtained, but by processes involving such expensive operations as a preliminary removal of a substantial part of the iron, or the use of large volumes during precipitation.

We have now discovered a process whereby excellent pigments may be manufactured economically without the necessity of such careful selection of the extender material and whereby they may be manufactured containing any percentage of titanium oxide up to and including pure titanium oxide, the precipitation of titanium being made from more or less concentrated solutions. In our process a part of the iron may or may not be removed as a preliminary step before the final precipitation of the titanium, as satisfactory results may be obtained with all the iron present even in solutions of ores high in iron.

Aqueous solutions of titanium sulphate are in a more or less metastable condition, depending somewhat on the degree of basicity or acidity of the solution. Crystalloid solutions of titanium sulphate, upon elevation of the temperature, hydrolyze, colloidal material is formed, and precipitation takes place if the temperature is held at or near the boiling point.

We have discovered that, the extender, calcium sulphate, especially when prepared according to a preferred method to be hereinafter described, which may be caused to exist in the solution in the form of finely divided solid particles, and which is both appreciably soluble and insoluble in the titanium ore solution, when present during hydrolysis, not only accelerates the hydrolytic precipitation of the titanium to a much greater extent than the ordinary relatively insoluble extenders, but also causes the precipitate to take a form having certain physical characteristics, so that upon separating it, washing, and calcining, a pigment having excellent color, opacity and other desirable properties is obtained. If an insoluble extender is also present, the precipitate and the resulting pigment will be of the composite type; if calcium sulphate is the only extender present and washing is continued until substantially all of the calcium sulphate is removed, the pigment will be of the pure titanium oxide type.

This accelerated precipitation we attribute to the large number of fine particles of the calcium sulphate which assist in breaking down the metastability of the solution by functioning as adsorptive nuclei for the compounds of titanium being precipitated. In this respect calcium sulphate acts somewhat after the nature of a catalyst. It apparently functions also in preventing the occlusion of iron and in maintaining an optimum particle size distribution.

As these titanium compounds are precipitated those which remain in solution in the crystalloid state are subjected to further hydrolysis at the elevated temperature, still more of the products of hydrolysis precipitate upon the crystal nuclei present, and so the precipitation continues until it is substantially complete. The hydrolytic precipitation of the titanium takes place with the liberation of sulphuric acid from the sulphate solution. Precipitation conditions are therefore constantly changing.

It is conceivable that under the changing conditions of concentrations, temperature, pressure, and total acidity in the solution, the calcium sulphate may partly dissolve in certain places or under certain conditions, and may precipitate and form fresh nuclei in other places or under other conditions.

In the manufacture of composite pigments containing relatively low percentages of titanium oxide, say up to 35%, the extender material of the composite furnishes sufficient nuclei, but there is a limit in its capacity to function in this manner and the additional calcium sulphate makes it possible to obtain good pigments containing higher percentages of titanium oxide, say 35% or more.

In such pigments, after the removal of the appreciably soluble nuclei, a part of the titanium oxide is coalesced with the extender and a part is unattached; the higher the percentage of titanium oxide, the greater the percentage which is unattached.

After substantially complete precipitation of the titanium, the precipitate is filtered or separated from its mother liquor by other means and washed with water. During the later stages of the washing process we may use a water solution of a salt, which will increase the solubility of the calcium sulphate. The presence of ammonium chloride, for example, in the wash water, greatly increases its solubility. Or we may sometimes find it advisable to discontinue washing before all the soluble nuclei is removed. In such cases a small amount of calcium sulphate, will appear in the finished product. The precipitate is finally calcined at a temperature ranging between 700° C. and 1200° C.

We are aware that calcium sulphate-titanium oxide composite pigments and methods for their manufacture have been described and claimed in U. S. Letters Patent No. 1,155,462 of October 15, 1915; Reissue No. 14,289 of April 24, 1917; No. 1,205,144 of November 21, 1916; No. 1,223,357 of April 24, 1917; No. 1,234,260 of July 24, 1917; No. 1,240,405 of September 18, 1917; No. 1,288,473 of December 24, 1918; and No. 1,680,316 of August 14, 1928.

Our present invention has nothing to do with the manufacture of calcium sulphate titanium oxide composites such as have been described and are now being made, but relates to the presence of calcium sulphate during the hydrolytic precipitation of titanium, which enables other composite titanium pigments, particularly those having a high percentage of titanium oxide, say 35% or more, as well as pure titanium oxide to be manufactured more economically than has hitherto been possible.

Our process is applicable also to the manufacture of composite pigments consisting of titanium oxide, calcium sulphate, and other extenders such as barium sulphate, silica, etc. In the manufacture of these composites washing is discontinued before all of the calcium sulphate is removed. We are aware that in U. S. Letters Patent No. 1,288,473, of December 24, 1918, there has been described and claimed, together with a method for its manufacture, a composite pigment consisting of a sulphate, another extender and titanium oxide, all three of which are coalesced.

In the product obtained when operating according to our process, the extenders are at least partly coalesced with the titanium oxide but not necessarily with each other. They are manufactured in separate containers and come in contact with each other after complete formation, except that during the hydrolytic precipitation of the titanium any calcium sulphate going into solution and recrystallizing is thus formed in the presence of the other extenders, but such formation is only incidental in our process and no advantage is ascribed thereto.

Our preferred form of calcium sulphate is that prepared by the addition of a water slurry of slaked lime to sulphuric acid. Such method may consist in adding a compound of calcium as, for example, hydrated lime or calcium carbonate to concentrated sulphuric acid or to a relatively concentrated aqueous solution of sulphuric acid. Concentrations can be adjusted and temperature controlled in such a manner as to produce by this method an extremely finely divided material having a crystalline structure which microscopic and X-ray examinations have determined to be that of anhydrite. Such anhydrite differs from the several types of gypsum previously used not only in crystalline structure and form but also in chemical composition, the anhydrite ($CaSO_4$) containing no water, whereas the different types of gypsum ($CaSO_4.2H_2O$) including acicular crystalline gypsum contain water as an integral part of each particle. However, any form of calcium sulphate, such as native anhydrite, native gypsum, or calcium sulphate artificially prepared in any manner whatsoever, may be used to some advantage.

In order that our invention may be more clearly understood and practised by any one skilled in the art, we now give two examples by which we have obtained excellent pigments, although we do not wish to be limited thereby; many variations are possible, all of which result in the distinct advantages desired.

An ilmenite ore was brought into solution with sulphuric acid, all of the iron and a small part of the titanium were reduced to lower valences, by a well known method, and the insoluble residue was allowed to settle. The clear supernatant solution, which was then used in carrying out the examples, analyzed as follows:

|  | Per cent |
|---|---|
| Titanium oxide ($TiO_2$) | 6.07 |
| Ferrous oxide (FeO) | 5.88 |
| Uncombined sulphuric acid | 6.45 |

*Example I.—Pure titanium oxide*

To 164 pounds of 78% sulphuric acid, at a temperature of 20° C., was added a slurry of 25 pounds of hydrated lime in 32 gallons of water at 70° C. The calcium sulphate thus formed was mixed with 1735 pounds of the above ilmenite solution. The mixture was then heated to boiling and boiled until about 95% of the titanium was precipitated, after which the precipitate was separated, washed substantially free from calcium sulphate, dried and calcined at 900° C.

The yield was found by analysis to contain:

| | |
|---|---|
| Titanium oxide | 99.1% |
| Calcium sulphate | Traces |
| Other substances | Traces |
| Sp. gr. of pigment | 3.9 |

*Example II.—75% titanium oxide, 25% barium sulphate*

To 150 pounds of 78% sulphuric acid, at a temperature of 20° C., was added a slurry of 25 pounds of hydrated lime in 28 gallons of water at 70° C. The calcium sulphate thus formed was mixed with 25 pounds of barium sulphate and 1300 pounds of the above ilmenite solution. The mixture was then heated to boiling and boiled until about 95% of the titanium was precipitated, after which the composite was separated, washed substantially free from calcium sulphate, dried and calcined at 900° C.

The yield was found by analysis to contain:

| | |
|---|---|
| Titanium oxide | 74.8% |
| Barium sulphate | 25.1% |
| Calcium sulphate | Traces |
| Other substances | Traces |
| Sp. gr. of pigment | 4.0 |

Both of these pigments are characterized by their clear white color, excellent brightness, and resistance to light. Clear tones are obtained with tinting colors. The pigment particles are extremely finely divided and soft and smooth in texture. They are readily miscible with the media in use in the paint, varnish, rubber and other processing industries and when mixed with these media have great obscuring power.

Having now disclosed our invention, we desire that as broad an interpretation may be placed thereon as is permissible in view of prior art.

We claim as our invention:—

1. The process for the manufacture of titanium pigments which consists in mixing calcium sulphate with a sulphuric acid solution of titanium to supply adsorptive nuclei therein, elevating the temperature to cause hydrolytic precipitation of titanium compounds on said nuclei, separating the precipitate, washing it substantially free from calcium sulphate and calcining it at a temperature ranging between 700° C. and 1200° C.

2. The process for the manufacture of titanium oxide which consists in mixing calcium sulphate with a sulphuric acid solution of titanium to supply adsorptive nuclei therein, elevating the temperature to cause hydrolytic precipitation of titanium compounds on said nuclei, separating the precipitate, washing it substantially free from calcium sulphate and calcining it at a temperature ranging between 700° C. and 1200° C.

3. The process for the manufacture of composite titanium pigments which consists in mixing a sulphuric acid solution of titanium with the extender material of the composite and calcium sulphate to supply adsorptive nuclei in said solution, elevating the temperature to cause hydrolytic precipitation of titanium compounds on said nuclei, separating the composite precipitate, washing it substantially free from calcium sulphate and calcining it at a temperature ranging between 700° C. and 1200° C.

4. The process for the manufacture of composite titanium oxide-barium sulphate pigments which consists in mixing a sulphuric acid solution of titanium with barium sulphate and calcium sulphate to supply adsorptive nuclei in said solution, elevating the temperature to cause hydrolytic precipitation of titanium compounds on said nuclei, separating the composite precipitate, washing it substantially free from calcium sulphate and calcining it at a temperature ranging between 700° C. and 1200° C.

5. The process for the manufacture of titanium pigments which consists in mixing a sulphuric acid solution of titanium with artificially prepared calcium sulphate having the crystalline structure of anhydrite, elevating the temperature to cause precipitation of titanium compounds by hydrolysis, separating the composite precipitate, washing it substantially free from calcium sulphate and calcining it at a temperature ranging between 700° C. and 1200° C.

6. The process for the manufacture of titanium oxide which consists in mixing a sulphuric acid solution of titanium with artificially prepared calcium sulphate having the crystalline structure of anhydrite, elevating the temperature to cause precipitation of titanium compounds by hydrolysis, separating the composite precipitate, washing it substantially free from calcium sulphate and calcining it at a temperature ranging between 700° C. and 1200° C.

7. The process for the manufacture of composite titanium pigments which consists in mixing a sulphuric acid solution of titanium with the extender material of the composite and artificially prepared calcium sulphate having the crystalline structure of anhydrite, elevating the temperature to cause precipitation of titanium compounds by hydrolysis, separating the composite precipitate, washing it substantially free from calcium sulphate and calcining it at a temperature ranging between 700° C. and 1200° C.

8. The process for the manufacture of composite titanium oxide-barium sulphate pigments which consists in mixing a sulphuric acid solution of titanium with barium sulphate and artificially prepared calcium sulphate having the crystalline structure of anhydrite, elevating the temperature to cause precipitation of titanium compounds by hydrolysis, separating the composite precipitate, washing it substantially free from calcium sulphate and calcining it at a temperature ranging between 700° C. and 1200° C.

9. The process for the manufacture of composite titanium oxide-barium sulphate pigments which consists in mixing a sulphuric acid solution of titanium with milled natural barytes and calcium sulphate to supply adsorptive nuclei in said solution, elevating the temperature to cause hydrolytic precipitation of titanium compounds on said nuclei, separating the composite precipitate, washing it substantially free from calcium sulphate and calcining it at a temperature ranging between 700° C. and 1200° C.

10. The process for the manufacture of titanium pigments which consists in mixing a sulphuric acid solution of titanium with calcium sulphate to supply adsorptive nuclei in said solution, elevating the temperature to cause hydrolytic precipitation of titanium compounds on said nuclei, separating the precipitate, washing it substantially free from calcium sulphate with the solution of a salt in which calcium sulphate is more soluble than in water and calcining it at a temperature ranging between 700° C. and 1200° C.

11. The process for the manufacture of titanium oxide which consists in mixing a sulphuric acid solution of titanium with calcium sulphate to supply adsorptive nuclei in said solution, elevating the temperature to cause hydrolytic precipitation of titanium compounds on said nuclei, separating the precipitate, washing it substantially free from calcium sulphate with the solution of a salt in which calcium sulphate is more soluble than in water and calcining it at a temperature ranging between 700° C. and 1200° C.

12. The process for the manufacture of composite titanium pigments which consists in mixing a sulphuric acid solution of titanium with the extender material of the composite and calcium sulphate to supply adsorptive nuclei in said solution, elevating the temperature to cause hydrolytic precipitation of titanium compounds on said nuclei, separating the composite precipitate, washing it substantially free from calcium sulphate with the solution of a salt in which calcium sulphate is more soluble than in water and calcining it at a temperature ranging between 700° C. and 1200° C.

13. The process for the manufacture of titanium pigments which consists in adding hydrated lime to sulphuric acid, mixing the resultant calcium sulphate with a sulphuric acid solution of titanium to supply adsorptive nuclei therein, elevating the temperature to cause hydrolytic precipitation of titanium compounds on said nuclei, separating the precipitate, washing it substantially free from calcium sulphate and calcining it at a temperature ranging between 700° C. and 1200° C.

14. The process for the manufacture of titanium oxide which consists in adding hydrated lime to sulphuric acid, mixing the resultant calcium sulphate with a sulphuric acid solution of titanium to supply adsorptive nuclei therein, elevating the temperature to cause hydrolytic precipitation of titanium compounds on said nuclei, separating the precipitate, washing it substantially free from calcium sulphate and calcining it at a temperature ranging between 700° C. and 1200° C.

15. The process for the manufacture of composite titanium pigments which consists in adding hydrated lime to sulphuric acid, mixing the resultant calcium sulphate with a sulphuric acid solution of titanium and the extender material of said composite, to supply adsorptive nuclei in the solution, elevating the temperature to cause hydrolytic precipitation of titanium compounds on said nuclei, separating the precipitate, washing it substantially free from calcium sulphate and calcining it at a temperature ranging between 700° C. and 1200° C.

16. The process for the manufacture of composite titanium oxide-barium sulphate pigments which consists in adding hydrated lime to sulphuric acid, mixing the resultant calcium sulphate with barium sulphate and with a sulphuric acid solution of titanium to supply adsorptive nuclei therein, elevating the temperature to cause hydrolytic precipitation of titanium compounds on said nuclei, separating the precipitate, washing it substantially free from calcium sulphate and calcining it at a temperature ranging between 700° C. and 1200° C.

17. The process for the manufacture of a composite pigment of titanium oxide, calcium sulphate and an extender, which consists in adding hydrated lime to sulphuric acid to produce calcium sulphate in the crystalline form of anhydrite, mixing the resultant calcium sulphate with an extender and with a sulphuric acid solution of titanium to supply adsorptive nuclei therein, elevating the temperature to cause hydrolytic precipitation of titanium compounds on said nuclei, separating the composite precipitate, washing it and calcining it at a temperature ringing between 700° C. and 1200° C.

18. The process for the manufacture of a composite pigment of titanium oxide, calcium sulphate and barium sulphate, which consists in adding hydrated lime to sulphuric acid to produce calcium sulphate in the crystalline form of anhydrite, mixing the resultant calcium sulphate with barium sulphate and with a sulphuric acid solution of titanium to supply adsorptive nuclei therein, elevating the temperature to cause hydrolytic precipitation of titanium compounds on said nuclei, separating the composite precipitate, washing it, and calcining it at a temperature ranging between 700° C. and 1200° C.

19. As a new article, an uncalcined composite precipitate comprising hydrated titanium oxide, an extender and calcium sulphate in the crystalline form of anhydrite.

20. As a new article, an uncalcined composite precipitate comprising hydrated titanium oxide, an extender and calcium sulphate, a part of which is in the crystalline form of anhydrite.

21. As a new article, a calcined pigment comprising titanium oxide, an extender and calcium sulphate in the crystalline form of anhydrite.

22. As a new article, a calcined pigment comprising titanium oxide, an extender and calcium sulphate, a part of which is in the crystalline form of anhydrite.

WILLIS F. WASHBURN.
LEIF AAGAARD.